(12) United States Patent
Baba et al.

(10) Patent No.: US 8,714,948 B2
(45) Date of Patent: May 6, 2014

(54) PERMANENT MAGNET MOTOR, HERMETIC COMPRESSOR, AND FAN MOTOR

(75) Inventors: Kazuhiko Baba, Tokyo (JP); Hayato Yoshino, Tokyo (JP); Koji Yabe, Tokyo (JP); Masahiro Nigo, Tokyo (JP); Koji Masumoto, Tokyo (JP); Tomoaki Oikawa, Tokyo (JP); Yoshio Takita, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 273 days.

(21) Appl. No.: 12/526,407

(22) PCT Filed: Feb. 26, 2007

(86) PCT No.: PCT/JP2007/053510
§ 371 (c)(1),
(2), (4) Date: Aug. 7, 2009

(87) PCT Pub. No.: WO2008/105049
PCT Pub. Date: Sep. 4, 2008

(65) Prior Publication Data
US 2010/0119390 A1    May 13, 2010

(51) Int. Cl.
*F04B 35/04*    (2006.01)

(52) U.S. Cl.
USPC ............... 417/423.7; 417/410.3; 310/156.53; 310/156.45; 310/216.091; 310/156.57; 310/216.106

(58) Field of Classification Search
USPC .......... 417/410.3, 423.7; 310/156.53, 156.45, 310/216.091–216.094, 156.57, 216.106
IPC ...................................................... H02K 1/27
See application file for complete search history.

(56) References Cited

U.S. PATENT DOCUMENTS

| | | | | | |
|---|---|---|---|---|---|
| 5,047,682 | A | * | 9/1991 | Burgbacher | ................... 310/361 |
| 5,170,083 | A | * | 12/1992 | Burgbacher | .................... 310/51 |

(Continued)

FOREIGN PATENT DOCUMENTS

| | | |
|---|---|---|
| CN | 1838514 A | 9/2006 |
| JP | 60-152240 A | 8/1985 |

(Continued)

OTHER PUBLICATIONS

International Search Report (PCT/ISA/210) for PCT/JP2007/053510, mailed May 1, 2007.

(Continued)

*Primary Examiner* — Devon Kramer
*Assistant Examiner* — Thomas Fink
(74) *Attorney, Agent, or Firm* — Buchanan Ingersoll & Rooney PC (57) ABSTRACT

An object is to provide a permanent magnet motor that highly reduces torque fluctuation, thereby reducing noise and vibration. The permanent magnet motor may be formed as follows: a length D of a permanent magnet 8 in a longitudinal direction is the same as or longer than a width A between sides of the magnetic pole tooth 3 in the circumferential direction in an end portion of the magnetic pole tooth 3, and a distance C between tip portions of a pair of the first slits 13*a* and 13*b* within the same pole is smaller than the width A between the sides of the magnetic pole tooth 3 in the circumferential direction in the end portion of the magnetic pole tooth 3. The permanent magnet motor, thus formed, may be characterized in that cut surfaces 12 face the first slits 13*a* and 13*b*.

14 Claims, 7 Drawing Sheets

(56) References Cited

U.S. PATENT DOCUMENTS

| | | | |
|---|---|---|---|
| 5,220,228 A * | 6/1993 | Sibata | 310/216.093 |
| 5,260,620 A * | 11/1993 | Morrill | 310/185 |
| 6,008,559 A * | 12/1999 | Asano et al. | 310/156.53 |
| 6,218,753 B1* | 4/2001 | Asano et al. | 310/156.53 |
| 6,369,478 B1* | 4/2002 | Koharagi et al. | 310/156.48 |
| 6,847,149 B2* | 1/2005 | De Filippis | 310/216.008 |
| 6,940,205 B1* | 9/2005 | Murakami et al. | 310/254.1 |
| 7,105,971 B2* | 9/2006 | Asai et al. | 310/156.53 |
| 7,622,841 B2* | 11/2009 | Yoshikawa et al. | 310/156.53 |
| 7,851,958 B2* | 12/2010 | Cai et al. | 310/156.53 |
| 2002/0047435 A1* | 4/2002 | Takahashi et al. | 310/156.56 |
| 2002/0171309 A1* | 11/2002 | Wakui et al. | 310/156.48 |
| 2003/0230948 A1* | 12/2003 | Murakami et al. | 310/156.53 |
| 2004/0007930 A1* | 1/2004 | Asai et al. | 310/156.53 |
| 2005/0062354 A1 | 3/2005 | Illes-Klumpner | |
| 2006/0119299 A1* | 6/2006 | Nishijima | 318/254 |
| 2006/0208593 A1 | 9/2006 | Park et al. | |
| 2006/0273678 A1* | 12/2006 | Futami | 310/156.53 |
| 2006/0279158 A1* | 12/2006 | Kim | 310/216 |
| 2007/0063607 A1* | 3/2007 | Hattori | 310/156.53 |
| 2007/0252467 A1* | 11/2007 | Hoemann et al. | 310/156.53 |

FOREIGN PATENT DOCUMENTS

| | | | |
|---|---|---|---|
| JP | 3-106869 A | 7/1991 | |
| JP | 09294344 * | 11/1997 | H02K 1/27 |
| JP | 11-098731 A | 4/1999 | |
| JP | 3301978 B2 | 7/2002 | |
| JP | 2005-027422 A | 1/2005 | |
| JP | 2005-143288 A | 6/2005 | |
| JP | 2005-245148 A | 9/2005 | |
| JP | 2006-014450 A | 1/2006 | |
| JP | 2006-14450 A | 1/2006 | |
| KR | 1020060099097 A * | 9/2006 | H02K 1/27 |
| WO | WO-03005531 A1 * | 1/2003 | H02K 1/27 |

OTHER PUBLICATIONS

Office Action from the State Intellectual property Office of the People's Republic of China issued in corresponding Chinese Patent Application No. 2007800393333 dated Oct. 13, 2010, with an English translation.

European Communication dated Feb. 6, 2013 issued in the corresponding European Patent Application No. 07737363.7.

European Communication Pursuant to Article 94(3) EPC dated Aug. 22, 2013 issued in the corresponding European Patent Application No. 07737363.7-1903 (5 pages).

* cited by examiner

PERMANENT MAGNET MOTOR, HERMETIC COMPRESSOR, AND FAN MOTOR

TECHNICAL FIELD

The present invention relates to a permanent magnet motor that allows for reduction in noise and vibration. The present invention also relates to a hermetic compressor and a fan motor that use the permanent magnet motor.

BACKGROUND ART

A concentrated winding system brushless DC motor has been proposed for reducing torque fluctuation (See Patent Document 1, for example). The brushless DC motor is designed to reduce torque fluctuation by the shape of tip portions of teeth portions on the inner diameter side of a stator core. The tip portion is provided with a cut surface on the inner peripheral surface of the tooth portion up to an opening which excludes a tooth body.

A motor using a rotor with buried permanent magnets therein has also been proposed (See Patent Document 2, for example). The motor using a rotor with buried permanent magnets therein is designed to achieve effective torque generation by preventing the short circuit of the magnetic flux at the both ends of a permanent magnet, and thereby allowing a stator to receive the magnetic flux even in the end portions of the permanent magnet. The motor using a rotor with buried permanent magnets therein is formed to include holes to prevent the short circuit of magnetic flux in the vicinity of the outer surface of a rotor core. The holes are formed in contact with the end portions of permanent magnet burying holes and the buried permanent magnets therein.

A permanent magnet rotating electric machine has also been proposed for solving noise issues (See Patent Document 3, for example). The permanent magnet rotating electric machine is designed to reduce harmonic magnetic flux by approximating the waveform of induced electromotive force to a sine wave without losing the effective magnetic flux (fundamental wave magnetic flux) of permanent magnets. The permanent magnet rotating electric machine has a stator with concentrated armature winding, and a rotor with permanent magnets embedded in a plurality of permanent magnet insert holes formed in a rotor core. The permanent magnet rotating electric machine is formed as follows. The rotor includes a multiple number of slits formed in the rotor core on the outer peripheral side of the permanent magnets. The slits are elongated from the inner peripheral side to the outer peripheral side of the rotor. The width of the slit in the circumferential direction is made narrower on the outer peripheral side of the rotor core than the inner peripheral side. The slits are spaced so that a distance between adjacent slits is made narrower on the outer peripheral side of the rotor core than on the inner peripheral side. A recess is then formed between poles on the outer peripheral side of the rotor core so that a magnetic pole angle of the rotor core is in a range of between 90 and 120 degrees of electric angle.

Patent Document 1: JP 3301978
Patent Document 2: JP 11-98731A
Patent Document 3: JP 2005-27422A

DISCLOSURE OF THE INVENTION

Problems to be Solved by the Invention

The permanent magnet motors disclosed in the patent document 1 through the patent document 3 are designed to reduce torque fluctuation by either reducing cogging torque, or reducing harmonic components in electromotive force, as described. The permanent magnet motors have, however, failed to reduce torque fluctuation sufficiently.

The present invention is directed to solving the above mentioned issues. It is an object to provide a permanent magnet motor, a hermetic compressor, and a fan motor that may highly reduce torque fluctuation and thereby allow for reduction in noise and vibration.

Means to Solve the Problems

A permanent magnet motor according to this invention may be characterized by including a stator that may include a stator core, which may be a layered cylindrical core. The stator core may include a plurality of slots that may be positioned in a circumferential direction; and magnetic pole teeth. Each of the magnetic pole teeth may be formed between adjacent slots among the plurality of slots, and formed into a convex shape on an inner peripheral side of the magnetic pole tooth. The stator core may also include cut surfaces that may be formed in both end portions on an inner peripheral surface of the magnetic pole tooth; and coils of concentrated winding that may be wound directly around the magnetic pole teeth. The permanent magnet motor may also be characterized by including a rotor that may be formed to face the magnetic pole teeth on the inner peripheral side of the magnetic pole teeth via an air gap. The rotor may be characterized by including a rotor core that may include: a plurality of magnet retaining holes that may be formed in places corresponding to respective sides of an approximate regular polygon whose center is the center of the axis; and first slits that may be formed to extend from both end portions of the magnetic retaining hole along a circumferential direction, and oriented toward a magnetic pole center; and permanent magnets that may be embedded in the magnet retaining holes, and magnetized so that N poles and S poles are arranged alternately. The permanent magnet motor may also be characterized in that a length D of a permanent magnet in a longitudinal direction may be at least the same length as a width A between sides of the magnetic pole tooth in the circumferential direction in the end portion of the magnetic pole teeth. The permanent magnet motor may also be characterized in that a distance C between tip portions of a pair of the first slits within the same pole may be smaller than the width A between the sides of the magnetic pole tooth in the circumferential direction in the end portion of the magnetic pole tooth. The permanent magnet motor may also be characterized in that the cut surfaces may thereby face the first slits.

The permanent magnet motor may be characterized by further including spaces that may be formed at end portions of the permanent magnet to keep the permanent magnet from being in contact with the rotor core.

The permanent magnet motor may be characterized in that a width B of the inner peripheral surface of the magnetic pole tooth excluding areas of the cut surfaces formed in the both end portions on the inner peripheral surface of the magnetic pole tooth may be smaller than the distance C between the tip portions of the pair of the first slits within the same pole.

The permanent magnet motor may be characterized by further including at least a pair of second slits that may be formed in the rotor core on the outside of the magnet retaining hole. The pair of second slits may be arranged like an inverted letter V and oriented toward a pole center.

The permanent magnet motor may be characterized in that a sum of widths of the pair of second slits in a short direction may be larger than the thickness of the permanent magnet in a short direction.

The permanent magnet motor may be characterized in that an angle formed by the pair of second slits may be at least 20 degrees.

The permanent magnet motor may be characterized in that the cut surfaces formed in the both end portions on the inner peripheral surface of the magnetic pole tooth may be perpendicular to a center line of the magnetic pole tooth.

The permanent magnet motor may be characterized by further including a raised portion that may be formed at an approximate center portion on the inner diameter side of the magnetic pole tooth. The raised portion may project toward the air gap.

The permanent magnet motor may be characterized in that a ratio of the number of the slots in the stator to the number of poles may be 3:2.

The permanent magnet motor may be characterized in that the permanent magnet motor may run at variable speeds using sine-wave voltage.

A hermetic compressor according to this invention may be characterized by including a hermetic housing that may include a compressing unit that compresses a refrigerant, and a motor unit that drives the compressing unit. The permanent magnet motor according to claim 1 may be used as the motor unit.

A fan motor according to this invention may be characterized by using the permanent magnet motor.

Effects

A permanent magnet motor according to this invention may achieve reductions in both harmonic components in electromotive force and cogging torque at the same time. This may result in reducing torque fluctuation, and thereby allowing for reduction in vibration and noise.

BEST MODE FOR IMPLEMENTING THE INVENTION

Embodiment 1

Figure 1:
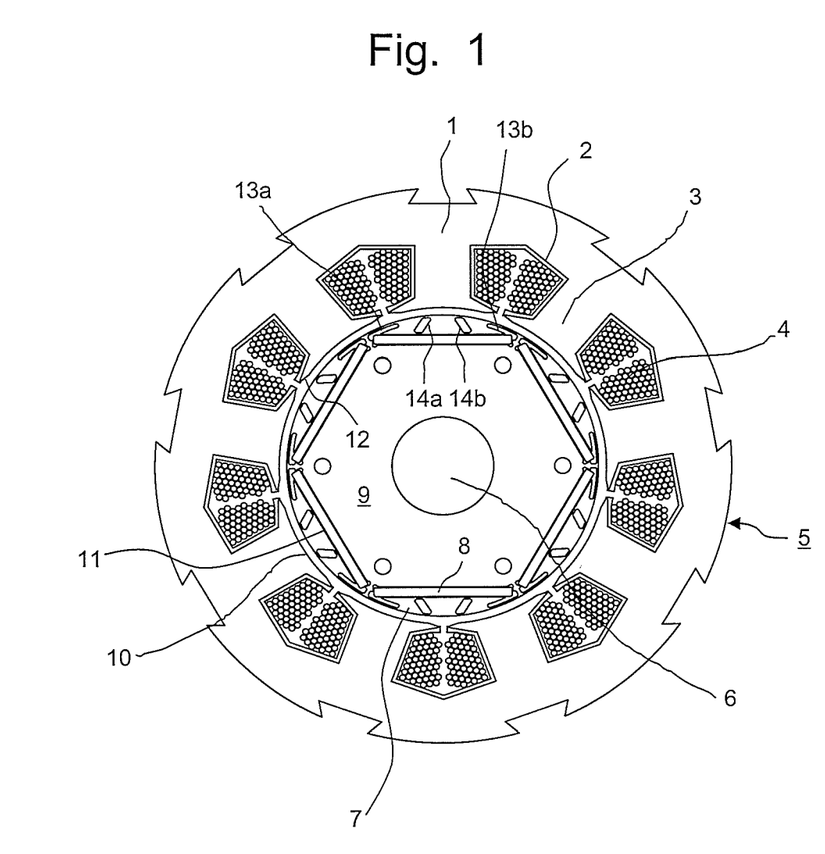
FIG. 1 It is a diagram describing a first embodiment, which shows a cross section of a permanent magnet motor that is formed with a ratio of 3:2 between the number of slots and the number of poles.
Figure 2:
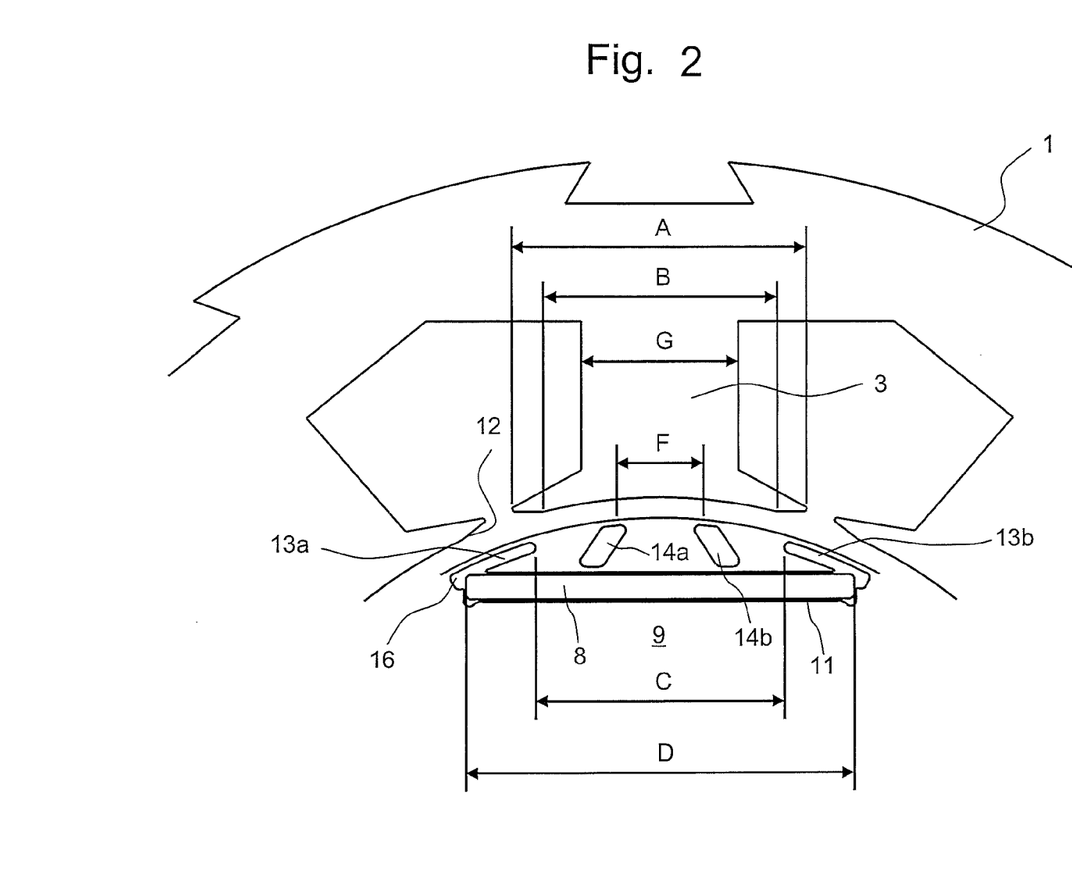
FIG. 2 It is a diagram describing the first embodiment, which shows an enlarged view of a part of a permanent magnet motor.
Figure 3:
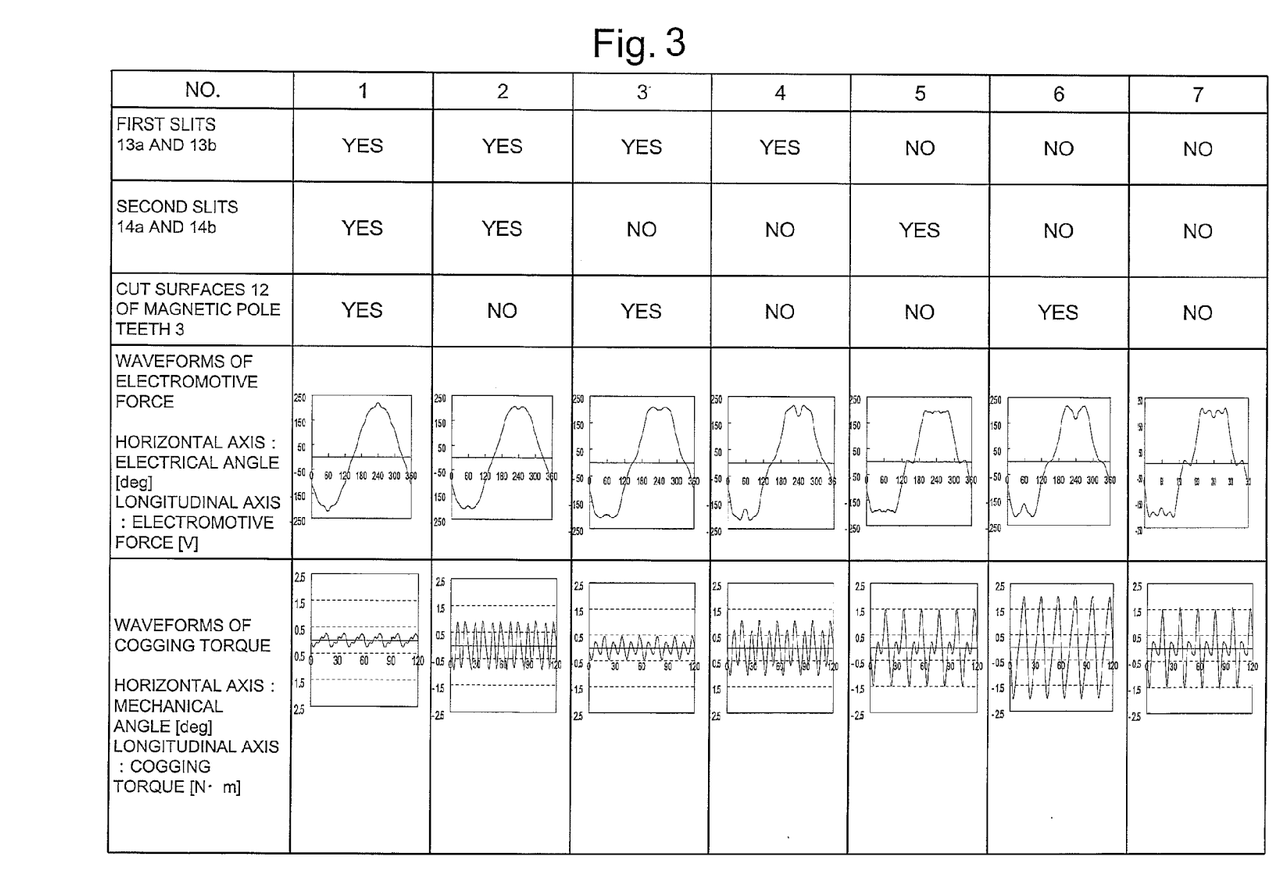
FIG. 3 It is a diagram describing the first embodiment, which shows a table of the waveforms of electromotive force and the waveforms of cogging torque.
Figure 4:
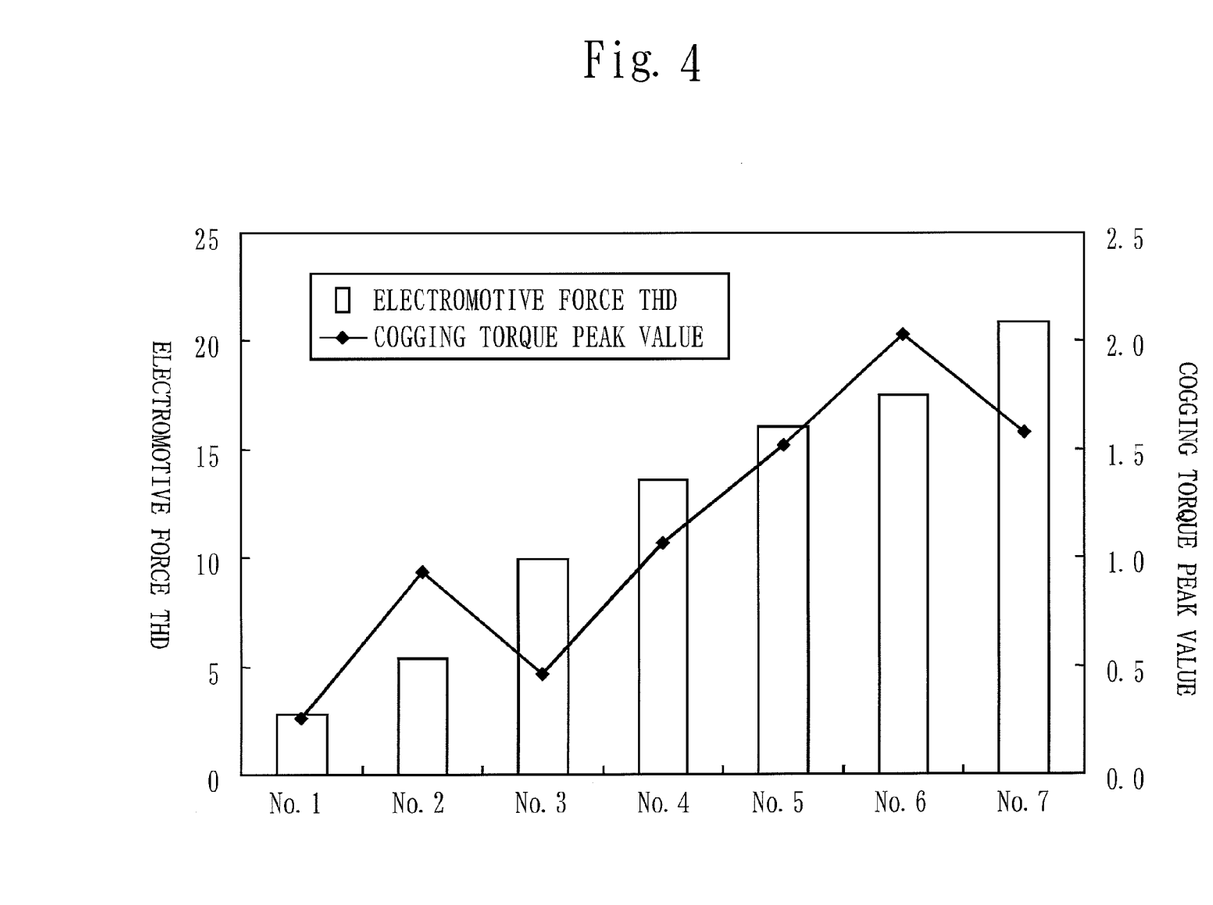
FIG. 4 It is a diagram describing a second embodiment, which shows a graph of harmonic contents in electromotive force and the peak values of cogging torque.

A first embodiment is illustrated in FIG. 1 through FIG. 4. FIG. 1 shows a cross section of a permanent magnet motor that is formed with a ratio of 3:2 between the number of slots and the number of poles. FIG. 2 shows an enlarged view of a part of a permanent magnet motor. FIG. 3 shows a table of the waveforms of electromotive force and the waveforms of cogging torque. FIG. 4 shows a graph of harmonic contents in electromotive force and the peak values of cogging torque.

Referring to FIG. 1, a cylindrical stator core 1 is formed by layering a predetermined number of thin magnetic steel plates, each plate being approximately 0.35 to 0.5 mm thick and having been punched out respectively. The stator core 1 includes nine slots 2 formed on the inner peripheral surface in a circumferential direction extending in the axial direction. Magnetic pole teeth 3 are formed each between adjacent slots 2. The magnetic tooth 3 includes approximately parallel sides from the outer diameter side to the inner diameter side. Both sides of the magnetic pole tooth 3 expand out in the circumferential direction, taking on a convex shape, toward the end portion (on the diameter side) of the magnetic pole tooth 3. The magnetic pole teeth 3 thus formed with the convex shape in the end portion may allow for an effective interlinkage of the magnetic forces of permanent magnets 8 embedded in a rotor 9 to the magnetic pole teeth 3. This structure may serve to improve torque.

Cut surfaces 12 are formed in the both end portions on the inner peripheral surface of the magnetic pole tooth 3. The cut surfaces 12 are formed approximately perpendicular to the center line of the magnetic pole tooth 3 in the longitudinal direction (the radial direction) so as to increase the length of an air gap 10 (See FIG. 2 as well).

Coils 4 are directly wound around the magnetic pole teeth 3 with a predetermined number of turns by concentrated winding of three-phase Y connection.

A rotary shaft 6 that can rotate inside a stator 5 is arranged on an axis line of the stator 5. The circular rotor 9 is secured to the rotary shaft 6. Between the rotor 9 and the stator 5 is the air gap 10 of about 0.3 mm to 1 mm provided, which allows for rotation about the rotary shaft 6.

A rotor core 7 is formed, like the stator 5, by layering magnetic steel plates, which have been punched out respectively. The rotor core 7 includes six magnet retaining holes 11 formed in positions corresponding to the respective sides of an approximate regular hexagon (an example of a regular polygon) whose center is the center of an axis. Six of the permanent magnets 8 are inserted respectively into the magnet retaining holes 11. The permanent magnets 8 are magnetized so that N poles and S poles are arranged alternately, thereby forming the six-pole rotor 9. The permanent magnets 8 may be flat rare-earth permanent magnets, main components of which may be neodymium, iron, and boron.

First slits 13a and 13b are formed in the both end portions of the magnet retaining hole 11. The first slits 13a and 13b are formed to extend along the circumferential direction, and are oriented toward the center of a magnetic pole.

A further description is given below with reference also to FIG. 2. A length D of the permanent magnet 8 in the longitudinal direction (the circumferential direction) is the same as or longer than a width A between sides of the magnetic pole tooth 3 in the circumferential direction in an end portion of the magnetic pole tooth 3; and a distance C between tip portions of a pair of the first slits 13a and 13b within the same pole is smaller than the width A between the sides of the magnetic pole tooth 3 in the circumferential direction in the end portion of the magnetic pole tooth 3. This may allow the cut surfaces 12 formed in the both end portions on the inner peripheral surface of the magnetic pole tooth 3 to face the first slits 13a and 13b.

A width B of the magnetic pole tooth 3 in the circumferential direction at the inner peripheral edge excluding the cut surfaces 12 formed in the both end portions on the inner peripheral surface of the magnetic pole tooth 3 is smaller than the distance C between the tip portions of the pair of the first slits 13a and 13b within the same pole.

Spaces 16 are provided at the end portions of the permanent magnet 8 on the peripheral side of the rotor in order to keep the permanent magnet 8 from being in contact with the rotor core 7. This may serve to reduce the leakage of the magnetic flux of the permanent magnet 8 at the end portions. This may also serve to control thermal demagnetization that may be caused by eddy current loss at the end portions of the permanent magnet 8 when motor is operating.

A pair of second slits 14a and 14b may be formed in the rotor core 7 on the outside of the magnet retaining hole 11. The pair of second slits 14a and 14b is arranged like an inverted letter V and is oriented toward the center of a magnetic pole. The pair of second slits 14a and 14b are formed so that a pitch F of the second slits on the peripheral side of the rotor is smaller than a width G of the magnetic pole tooth 3 where the pitch F is a distance between the second slits 14a and 14b measured from the center portions of the respective slits on the peripheral side of the rotor. Note that the number of the second slits 14a and 14b may also be more than the one pair described above.

The sum of the widths of the pair of second slits 14a and 14b in the short direction (in an approximate circumferential direction) may be greater than the thickness of the permanent magnet 8 in the short direction (in a radial direction). This may result in enhancing the convergence effect of magnetic flux generated by the permanent magnet 8. Hence, harmonic components in electromotive force may be reduced effectively.

An angle formed by the pair of second slits 14a and 14b arranged like an inverted letter V may be 20 degrees or more where the angle is the angle of intersection of the center lines of the respective slits in the longitudinal direction. This may result in enhancing the convergence effect of magnetic flux generated by the permanent magnet 8 to the magnetic pole teeth 3. Hence, harmonic components in electromotive force may be reduced effectively without reducing fundamental wave components in the electromotive force.

Effects of this embodiment will be discussed here with reference to FIG. 3 and FIG. 4. FIG. 3 shows a table of the waveforms of electromotive force and the waveforms of cogging torque of a permanent magnet motor. FIG. 4 shows a graph that compares on the same graph the THD (an index representing harmonic content in electromotive force) of electromotive force in different forms of a permanent magnet motor and the peak values of cogging torque.

Referring to the figure, No. 1 to No. 7 show different combinations among the first slits 13a and 13b, the second slits 14a and 14b, and the cut surfaces 12 of the magnetic pole tooth 3. The details of the combinations are shown in the table of FIG. 3.

Consequently, a shape No. 1 may be observed to have an effect on reducing both harmonic components in electromotive force and the peak value of cogging torque more significantly than any shape of No. 4 to No. 7. The shape No. 1 includes the first slits 13a and 13b, the second slits 14a and 14b, and the cut surfaces 12 of the magnetic pole teeth 3. The shape No. 7 includes none of the first slits 13a and 13b, the second slits 14a and 14b, and the cut surfaces 12 of the magnetic pole teeth 3. The shapes No. 4, No. 5, and No. 6 each include one of the pair of first slits 13a and 13b, the pair of second slits 14a and 14b, and the cut surfaces 12 of the magnetic pole teeth 3.

It is also clear from FIG. 3 and FIG. 4 that the shapes No. 2 and No. 3 may both have an effect on reducing harmonic components in electromotive force and the peak value of cogging torque. The shape No. 2 includes the first slits 13a and 13b, and the second slits 14a and 14b. The shape No. 3 includes the first slits 13a and 13b, and the cut surfaces 12 of the magnetic pole teeth 3.

According to this embodiment, the permanent magnet 8 is flat in shape, and the six pieces of the permanent magnets 8 are arranged along the circumferential direction to form an approximate regular hexagon, as described. The number, shape, and arrangement of the permanent magnets 8, however, are not limited to those described in this embodiment.

The permanent magnet motor described in this embodiment may be operated at variable speed with a sine wave voltage waveform. This may result in reducing torque pulsation highly effectively.

Embodiment 2

Figure 5:
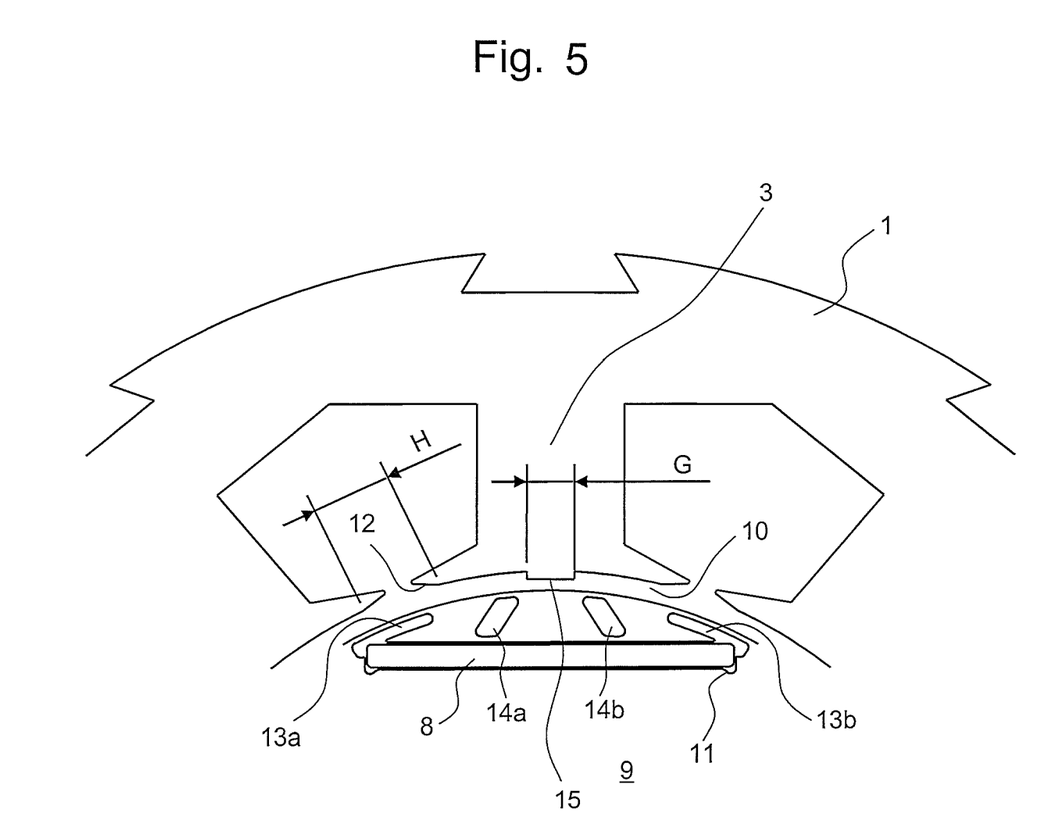
FIG. 5 It is a diagram describing the second embodiment, which shows a cross section of a permanent magnet motor.

FIG. 5 shows a diagram describing a second embodiment, illustrating a cross section of a permanent magnet motor.

the first embodiment is formed to include the first slits 13a and 13b, the second slits 14a and 14b, and the cut surfaces 12 formed in the both end portions on the inner peripheral surface of the magnetic pole tooth 3. According to this embodiment, the permanent magnet motor is formed to add a raised portion 15 at an approximate center portion of the magnetic pole tooth 3 on the inner diameter side. The raised portion 15 projects toward the air gap 10.

The raised portion 15 may serve to generate cogging torque in opposite phase to that of the cogging torque generated in the first embodiment, thereby allowing for further reduction in cogging torque. The raised portion 15 may be formed as follows: a width G of the raised portion 15 in the circumferential direction is the same as or narrower than a width H of a slot opening portion that includes the cut surfaces 12 of the magnetic pole teeth 3, and the height of the raised portion 15 is ¼ or higher than an air gap length (the length of the air gap 10 in the radial direction). This may result in an effect on reducing cogging torque components without increasing harmonic components in electromotive force.

Embodiment 3

Figure 6:
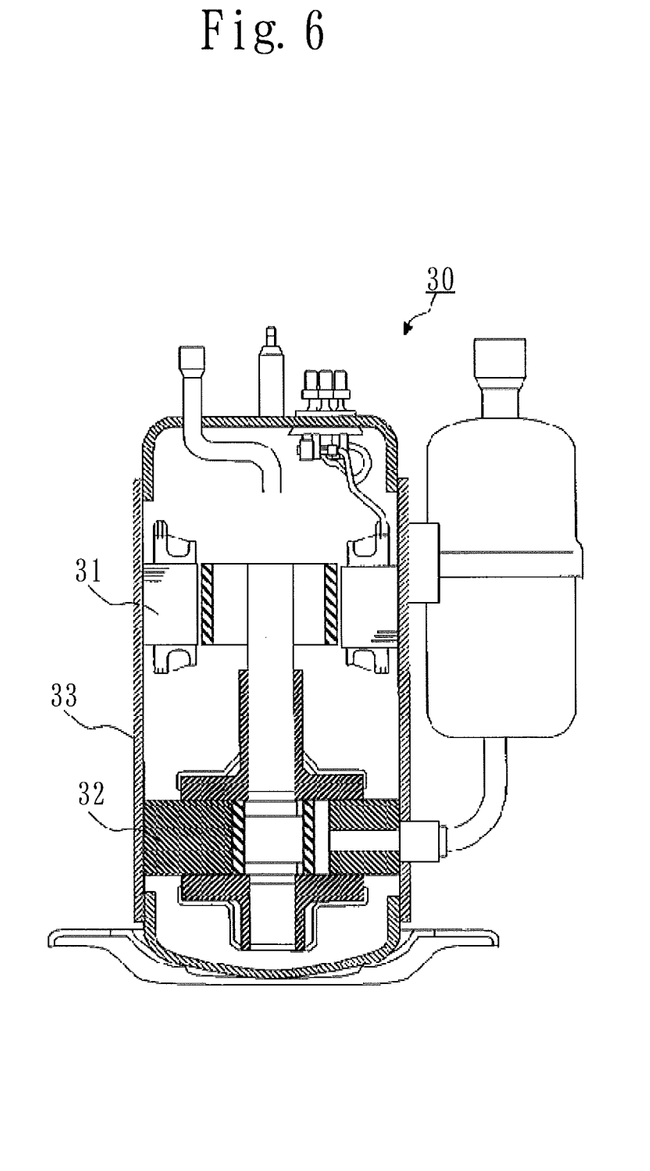
FIG. 6 It is a diagram describing a third embodiment, which shows a vertical cross section of a rotary compressor 30.

FIG. 6 shows a diagram describing a third embodiment, illustrating a vertical cross section of the rotary compressor 30.

This embodiment is an example where the permanent magnet motor described in the first or second embodiment is installed in the rotary compressor (an example of a hermitic compressor).

Referring to FIG. 6, the rotary compressor 30 contains within a hermetic housing 33 a motor unit 31 and a compressor unit 32. By using the permanent magnet motor described in the first or second embodiment for the motor unit 31, torque pulsation may be controlled, and thereby the vibration and noise of the rotary compressor 30 may be reduced.

Note that any type of refrigerant may be available for the rotary compressor 30, such as a refrigerant R32 with a low warming potential, a refrigerant R290, a traditional refrigerant R410A, a refrigerant R407C, and a refrigerant R22, etc.

Embodiment 4

Figure 7:
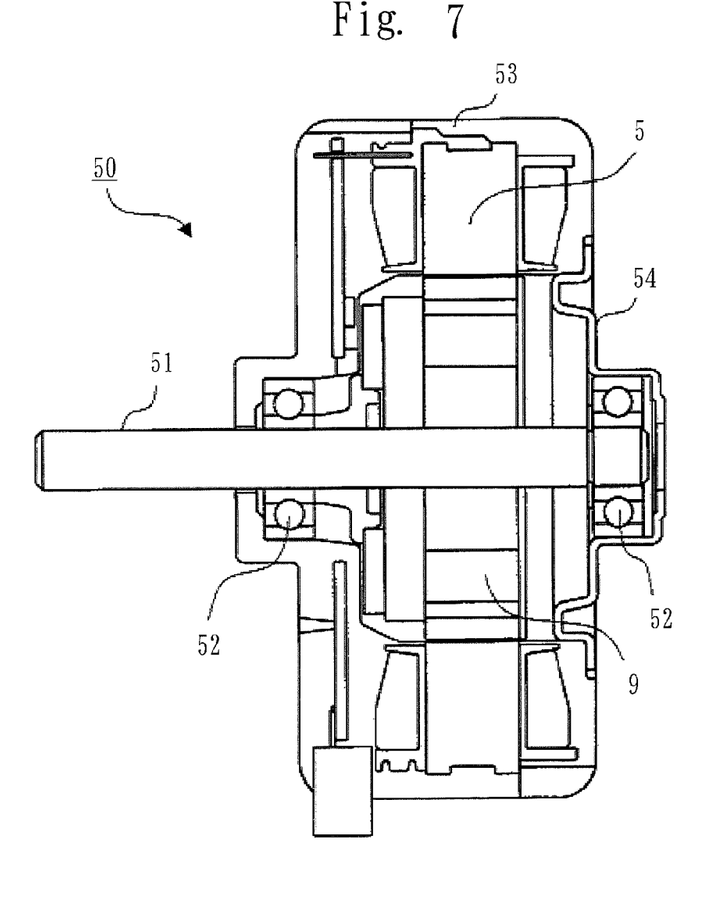
FIG. 7 It is a diagram describing a fourth embodiment, which shows a cross section of a fan motor 50.

FIG. 7 shows a diagram describing a fourth embodiment, illustrating a cross section of the fan motor 50.

The figure shows an example where the permanent magnet motor described in the first or second embodiment is installed in the fan motor 50.

Referring to FIG. 7, the fan motor 50 is an assembly of a mold stator 53 where the stator 5 described in the first or second embodiment is molded, and a rotor assembly 51 where the rotor 9 described in the first or second embodiment is fitted to the rotary shaft 6 together with bearings 52. The mold stator 53 and the rotor assembly 51 are supported by a bracket 54.

The fan motor 50, thus formed, may control torque pulsation, and thereby reducing vibration and noise. This may also achieve implementation of the fan motor 50 with significantly improved lifetime.

EXPLANATION OF REFERENCE NUMERALS 1 stator core
2 slot
3 magnetic pole teeth
4 coil
5 stator
6 rotary shaft
7 rotor core
8 permanent magnet
9 rotor
10 air gap
11 magnet retaining hole
12 cut surface
13a first slit
13b first slit
14a second slit
14b second slit
15 raised portion
16 space
30 rotary compressor
31 motor unit
32 compressor unit
33 hermetic housing
50 fan motor
51 rotor assembly
52 bearing
53 molded stator
54 bracket

The invention claimed is:

1. A permanent magnet motor comprising:
a stator; and
a rotor,
the stator including:
a stator core, which is a layered cylindrical core, including a plurality of slots positioned in a circumferential direction; magnetic pole teeth each formed between adjacent slots among the plurality of slots; and cut surfaces formed in circumferential end portions on an inner peripheral surface of each of the magnetic pole teeth; and
coils of concentrated winding that are wound directly around the magnetic pole teeth,
the rotor, which faces an inner peripheral side of the magnetic pole teeth via an air gap, including:
a rotor core including magnet retaining holes formed in places corresponding to respective sides of an approximate regular polygon whose center is a center of an axis; and pairs of first slits, each pair extending from circumferential end portions of each of the magnet retaining holes along the circumferential direction, and being oriented toward a magnetic pole center; and
permanent magnets that are embedded in the magnet retaining holes, and are magnetized so that N poles and S poles are arranged alternately,
wherein each of the circumferential end portions of each of the magnet retaining holes has a continuous space in which at least two radially outward facing surfaces and a radially inward facing surface of each of the permanent magnets are exposed so as to be kept from being in contact with the rotor core, and
wherein a length D of each of the permanent magnets in a longitudinal direction is no less than a width A between the circumferential end portions on the inner peripheral surface of each of the magnetic pole teeth in the circumferential direction,
a distance C between tip portions of each pair of first slits is smaller than the width A between the circumferential end portions on the inner peripheral surface of each of the magnetic pole teeth in the circumferential direction, and
thereby the cut surfaces face the pairs of first slits.

2. The permanent magnet motor according to claim 1, wherein a width B of the inner peripheral surface of each magnetic pole tooth excluding areas of the cut surfaces formed in the both end portions on the inner peripheral surface of each magnetic pole tooth is smaller than the distance C between the tip portions of each pair of first slits.

3. The permanent magnet motor according to claim 1, further comprising at least a pair of second slits that is formed in the rotor core on an outside of each magnet retaining hole, the pair of second slits being arranged like an inverted letter V and oriented toward a pole center.

4. The permanent magnet motor according to claim 3, wherein a sum of widths of the pair of second slits in a short direction is larger than a thickness of one of the permanent magnets in a short direction.

5. The permanent magnet motor according to claim 3, wherein an angle formed by the pair of second slits is at least 20 degrees.

6. The permanent magnet motor according to claim 1, wherein the cut surfaces formed in the both end portions on the inner peripheral surface of each magnetic pole tooth are perpendicular to a center line of the magnetic pole tooth.

7. The permanent magnet motor according to claim 1, further comprising:
a raised portion that is formed at an approximate center portion on an inner diameter side of each magnetic pole tooth, the raised portion projecting toward the air gap.

8. The permanent magnet motor according to claim 1, wherein a ratio of a number of the slots in the stator to a number of poles is 3:2.

9. The permanent magnet motor according to claim 1, wherein the permanent magnet motor runs at variable speeds using a sine-wave voltage.

10. A hermetic compressor comprising:
a hermetic housing that includes:
a compressing unit that compresses a refrigerant; and
a motor unit that drives the compressing unit,
wherein the permanent magnet motor according to claim 1 is used as the motor unit.

11. A fan motor that uses the permanent magnet motor according to claim 1.

12. The permanent magnet motor according to claim 7, wherein a width G of the raised portion in the circumferential direction is the same as or narrower than a width H of a slot opening portion, the width H including the cut surfaces of each magnetic pole teeth at the opening portion.

13. The permanent magnet motor according to claim 7, wherein a height of the raised portion is ¼ or higher than a length of the air gap in the radial direction.

14. The permanent magnet motor according to claim 1, wherein the at least two surfaces of each permanent magnet form a corner that is exposed in each space.

\* \* \* \* \*